Patented Apr. 20, 1937

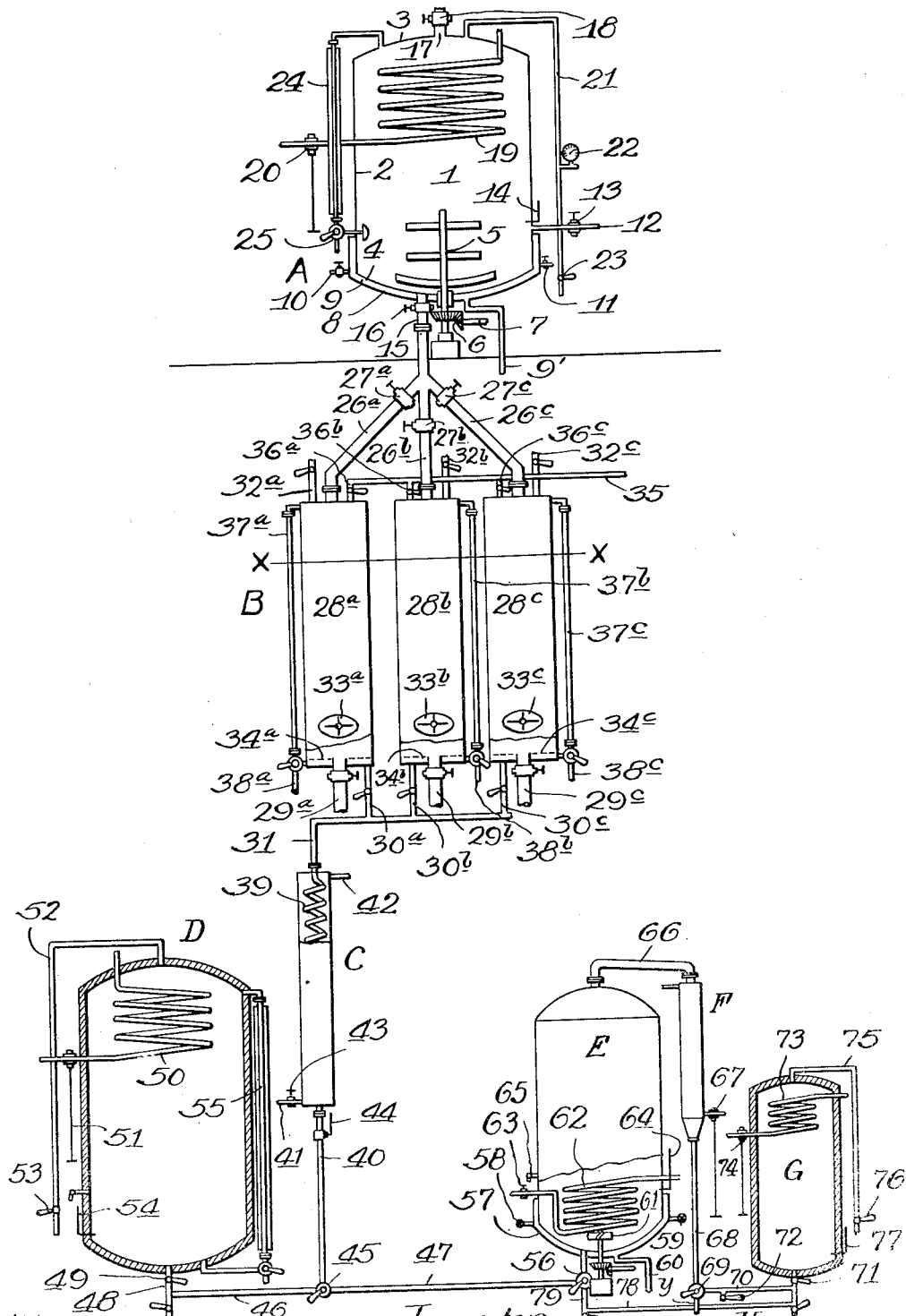

2,077,564

UNITED STATES PATENT OFFICE 2,077,564

COFFEE EXTRACT AND METHOD OF AND APPARATUS FOR PRODUCING THE SAME

Herman Heuser, Evanston, Ill.

Application November 26, 1934, Serial No. 754,827

13 Claims. (Cl. 99—71)

This invention relates to a method of preparing coffee extract, the coffee extract prepared thereby and apparatus for carrying out said method. More particularly this invention includes the concentrating of coffee extract and the preparation of a coffee distillate containing the volatile aroma substances of roasted coffee.

The customary concentrated coffee extracts made with coffee solvents such as alcohol, sulphuric ether and petroleum ether, are of poor quality, those made with alcohol possessing after the removal of the alcohol only very little coffee aroma and coffee taste, but in addition a very bitter taste and a fatty or greasy appearance, while those made with ether possess after the removal of the ether hardly any coffee aroma and coffee taste, and in addition they possess a fatty appearance. While alcohol and ether are fat solvents and readily dissolve the coffee fat, they do not dissolve the caffeol for the reason, no doubt, that caffeol is not a fat or fatty oil.

Also the customary coffee extracts made with water as the coffee solvent are not concentrated, but they frequently receive an addition of substances soluble in coffee extract as, for example, lactose and sucrose. While the addition of these latter substances raises the gravity of the customary coffee extracts made with water as the solvent, this addition increases the volume of the coffee extract to such a degree that it in reality dilutes or reduces the coffee constituents of these extracts.

I have discovered that with water as the coffee solvent a concentrated coffee extract rich in fragrance of coffee aroma and coffee taste can be made if the concentration of the coffee extract is so carried out that a reducing agent will be contained not only in the extract but also in the vapors rising from the heated extract and in the distillate or condensed vapors, that portion of the distillate containing the volatile aroma substances of the coffee extract being returned to the extract after the concentration of the extract.

I employ in carrying out my invention a volatilizable reducing agent of any suitable kind as, for example, a sulphur-containing reducing agent of the order of sulphur-dioxide, sulphurous acid or hypo-sulphurous acid, which are volatilizable by themselves, or a sulphur-containing reducing agent that can be made volatilizable by chemical reaction as, for example, an alkali sulphite which can be made volatilizable by an acid. The latter type of reducing agent I wish to be here understood as being included under the term "volatilizable reducing agent."

In carrying out this invention I may also employ, together with a volatilizable reducing agent, a non-volatilizable reducing agent such as phosphorous or hypo-phosphorous acid, or a water-soluble salt of these acids. In order that during the warm and hot stage of the coffee extraction from the ground roasted coffee the coffee brew is not depreciated in its coffee taste and coffee aroma, the volatilizable reducing agent as such or in conjunction with a non-volatilizable reducing agent is added to the materials, that is to the ground roasted coffee and the water employed for making the coffee extract, before said heated stage.

Among the objects of my invention are the provision of steps for carrying out the above and the production of a coffee extract of any desired high concentration without depreciation in coffee aroma and coffee taste.

A further object of this invention is to provide apparatus for carrying into practice the method of this application, which apparatus will operate in an economical and efficient manner.

Another object is to provide for the production of a primary coffee extract which is particularly rich in fragrant coffee aroma and coffee taste, and therefore requiring no concentration to improve it.

A still further object of this invention is to provide for the distillation of a portion of the dilute coffee extract remaining after the primary extract has been taken off, and condensing the vapors which carry the volatile aroma substances of the extract, the boiling of this dilute secondary extract being continued until the extract has been concentrated to the desired degree, and then returning the distillate and mixing the same with the concentrated secondary extract.

Another object is to concentrate the primary extract to a fraction of its original volume and adding distillate thereto as desired, the final product being in liquid form and of high concentration.

Still another object is the provision of a concentrated coffee extract with water as the coffee solvent, the concentration of the coffee extract being so carried out that a reducing agent is contained not only in the extract but also in the vapors rising from the heated extract and in the distillate or condensed vapors.

A further object is the provision of a coffee distillate having the volatile aroma substances of roasted coffee.

Further objects, advantages and capabilities will later more fully appear.

My invention further resides in the combination, construction and arrangement of parts shown in the accompanying drawing, and while I have illustrated therein a preferred embodiment I wish it to be understood that the same is susceptible of modification and change without departing from the spirit of my invention.

The single view in the drawing is a more or less diagrammatic showing of an apparatus system for carrying out my invention, portions being shown in section for the sake of clearness.

Referring more particularly to the drawing, my improved apparatus comprises in general a brewing apparatus A, a set of tanks B, a cooler C, a primary extract receiving tank D, a distilling tank E having a condenser F, and a distillate receiving tank G.

Describing these parts more in detail, the brewing apparatus A comprises a closed tank 1, preferably covered with an insulating material not shown, this tank being made of steel or any other suitable material and preferably being glass-lined on the inside. This tank comprises vertical side walls 2, a dished top wall 3 and dished bottom wall 4. This tank is also provided at its lower portion with a stirrer 5, driven through suitable gearing 6 by shaft 7 from any suitable source of motive power desired. This tank is also provided with a steam jacket 8 so arranged as to provide a steam space 9 between the steam jacket and the lower portion of the tank 1, the entry of steam into this steam jacket being controlled by valves 10 and 11, this steam being supplied from any suitable and available source. Leading from this steam jacket is an outlet pipe 9' leading to a steam trap or other desirable place of disposition.

There is connected into the side wall of tank 1 a pipe line 12 leading to a suitable source of water supply, this pipe line being controlled by valve 13. A thermometer 14 is also provided to enable reading of the temperature within the tank, which tank is also provided with an outlet pipe 15, which in turn is controlled by a gate valve 16. In the upper portion of tank 1 is provided a filling pipe 17, which is controlled by a gate valve 18, this filling pipe functioning as an inlet opening for the ground roasted coffee, this pipe connecting the tank 1 with the ground roasted coffee hopper scale.

There is also provided in tank 1 a spiral cooling coil 19 through which any desired cooling medium may be passed, such as cooled water, brine or the like, this cooling coil being suitably constructed to pass through the walls of the tank and being controlled by valve 20. This cooling coil 19 operates to cool the coffee brew and the atmosphere above the brew to prevent loss of coffee aroma by volatilization. Tank 1 is also provided with a vent pipe 21, which in turn carries a pressure gauge 22 and a valve 23, the latter being for closing or opening this vent pipe. A liquid level gauge 24 is also provided upon the side of tank 1 to enable the height of the liquid in the tank to be read thereon, this liquid gauge also being provided at its bottom portion with a two-way cock 25, by means of which samples of the liquid contents of tank 1 can be drawn from the tank for sampling purposes.

The outlet pipe 15 leading from the bottom of tank 1 connects at its lower end with three branch pipes 26a, 26b and 26c, these pipes being controlled respectively by suitable gate valves 27a, 27b and 27c. The lower ends of branch pipes 26a, 26b and 26c connect respectively with the upper end of tanks 28a, 28b and 28c, which tanks are preferably covered by an insulating material not shown. These tanks are provided at their bottom with coffee ground outlet pipes 29a, 29b and 29c, each of which is controlled by a suitable gate valve. Also leading from the bottom of the tanks are the valved pipes 30a, 30b and 30c, through which the liquid in the tanks passes into the outlet manifold 31 and from thence to the cooler C. The tanks are also provided at their upper ends with valved vent pipes 32a, 32b and 32c, and in their sides near the bottom with manhole covers 33a, 33b and 33c. It will also be noticed that the upper end of the outlet pipes 29a, 29b and 29c extend a short distance above the bottom of the tank. Extending from the upper open end of these pipes to the inner circumference of the tank side wall and spaced a distance above the bottom of the tank, is a perforated filtering screen 34a, 34b and 34c, the mesh of each of these screens being large enough to permit the liquid to pass therethrough and into outlet pipes 30a, 30b and 30c, but small enough to prevent the grounds from passing into the last mentioned pipes. To provide for the introduction of water into the interior of these tanks, water pipe 35 leading from any suitable source of water supply is connected to the tanks respectively by valved pipe connections 36a, 36b and 36c. These tanks are also respectively provided with liquid gauges 37a, 37b and 37c to register the level of liquid in the tanks. At the bottom of these liquid gauges are respectively provided outlets 38a, 38b and 38c, each being controlled by a suitable two-way cock to permit the drawing therefrom of samples of the liquid within the tanks.

Pipe 31 described above as leading the liquid contents from the tanks into the cooler C, extends into the latter in the form of a coil 39, which coil passes through the cooler and out through the bottom in the form of pipe 40. Cooler C is provided near its top and bottom side walls with inlet and outlet pipes 41 and 42, the flow of cooling medium to the interior of cooler C being controlled by valve 43. As will be readily understood, this cooling medium surrounds coil 39 and may consist of cooling water, brine or other suitable cooling medium. A thermometer 44 is provided just below the cooler C for registering the temperature of the liquid passing from the tanks therethrough. At the lower end of the cooler outlet pipe 40 is a three-way cock 45 controlling passage of the liquid from pipe 40 either through pipe 46 or pipe 47. Pipe 46 connects into pipe 48, which in turn connects with the bottom of the primary extract receiving tank D, entry of liquid thereinto being controlled by valve 49. Pipe 48 also extends downwardly and has a valve controlled lower end whereby liquid from the interior of tank D may be drawn as desired. Receiving tank D is provided on its interior with a spiral cooling coil 50 controlled by valve 51 to cool the atmosphere within the tank. This tank is further provided with a vent pipe 52 controlled by valve 53. A thermometer 54 is also provided near the bottom of tank D for registering the temperature of the primary extract within the tank. A liquid gauge 55 is also provided along the side of tank D for indicating the height of liquid therein. As seen in the drawing, receiving tank D is covered with an insulating material, preferably cork.

When desired, three-way cock 45 may be turned to cut off the flow of liquid from cooler C to pipe 46 and receiving tank D, and open communication from cooler C to pipe 47, from which under control of two-way cock 56 the liquid may pass into distilling tank E, which tank is provided around its lower portion with a steam jacket 57, the entry of steam thereinto being controlled by valves 58 and 59. Steam jacket 57 is also provided with outlet pipe 60, through which the steam flows to a steam trap or other place of disposition desired. Distilling tank E is also provided with a stirring device 61 and a spiral cooling coil 62 controlled by valve 63. This tank is further provided with a thermometer 64 for registering the temperature of the contents of the tank. A sample spigot 65 is provided in the side of tank E.

From the top of tank E extends the vapor outlet pipe 66, which pipe leads to condenser F, into which condenser the flow of the cooling medium is controlled by valve 67. Condenser F connects by pipe 68 two-way cock 69, pipe 70 and stop-cock 71 with the distillate receiving tank G. When desired, two-way cock 69 may be turned to close off the connection with pipe 70 and establish connection with an outlet pipe $y$ therebelow leading to the waste receiver at such times as the condensed distillate is too weak in aroma substances. Pipe 70 is equipped with spigot 72 for sampling the distillate as it flows from the condenser F to the distillate receiving tank G. Tank G is provided near the top of its interior with a spiral cooler 73 controlled by valve 74 to cool the atmosphere in the interior of the tank G. This tank is further equipped with a vent pipe 75 controlled by valve 76. A thermometer 77 is provided for indicating the temperature of the contents of the tank. Tank G also connects by pipes 78 and 79 with distilling tank E, such connection with tank E being controlled by two-way cock 56. As shown, the distillate receiving tank G is covered by an insulating material, preferably cork.

I will now describe a process suitable to carry out in my improved apparatus described herein my invention with water as the solvent for the coffee substances.

A suitable volatilizable reducing agent, for example, sodium pyro-sulphite, in the proportion of 0.3 part by weight of volatilizable reducing agent to 100 parts by weight of the roasted coffee, and a non-volatilizable reducing agent, for example, sodium hypo-phosphite, in the proportion of one part by weight of non-volatilizable reducing agent to 100 parts by weight of the roasted coffee, are spread out on the bottom of the tank 1. The ground roasted coffee is run from the hopper scale (not shown) through gate valve 18 and pipe 17 into the tank 1, and at the same time water is run thereinto through water line 12 in a concentrated proportion of, for example, one part by weight of coffee and five parts by weight of water, the stirrer 5 at the same time being in motion and vent pipe 21 open.

The amount of coffee charged into tank 1 is, together with a proportional amount of water, sufficient to fill tank 1 nearly up to the top, leaving only a little more space than is required for the expansion of the brew during the subsequent heating of the same. The temperature of the brewing water added, as pointed out above, to tank 1 is generally so low, for example, 10 to 15° C. as to prevent volatilization of coffee aroma during the filling up of tank 1 with these materials. Vent pipe 21 is now closed by closing valve 23, and thereupon with stirrer 5 in motion the brew is heated to a temperature sufficiently high to dissolve all of the water soluble coffee substances, the heat being supplied by opening valves 10 and 11 of the steam jacket 8.

In the present case the brew is heated to 80 to 90° C. When this temperature is reached the heat of the brew is continued only as much as is required to keep its temperature at from 80 to 90° C. After all the soluble substances of the coffee have been dissolved the heating is stopped. This stage is reached when the saccharometer indication of the filtered samples taken at two-way cock 25 of liquid gauge 24 does not rise any more. During the heating of the brew in the hermetically sealed tank 1 the pressure on the same rises usually to about seven to ten pounds per square inch, as will be shown on pressure gauge 22.

With vent pipe 21 remaining closed and with stirrer 5 continuing to rotate, the brew is now cooled by opening valve 20 of cooling coil 19. The pressure on the brew in the hermetically sealed tank 1 returns during the cooling to substantially atmospheric pressure. When the temperature of the brew is thus reduced to about 10 to 15° C. the cooling is stopped by closing valve 20, and thereupon with vent pipe 21 of tank 1 and vent pipes 32a, 32b and 32c of the tanks B open and the stirrer 5 continuing to run, the brew is run into the tanks, first through gate valve 27a into tank 28a, then through gate valve 27b into tank 28b, and then through gate valve 27c into tank 28c. The tanks are thus filled up nearly to the top, which can be accurately accomplished by noting the level of the liquid in the liquid gauges 37a, 37b and 37c.

When during the running of the brew into the tanks the level of the brew in tank 1 has arrived at the lowest point of the cooling coil 19, as will be indicated on liquid gauge 24, valve 20 of the cooling coil 19 will be opened to cool the atmosphere above the brew. Thereupon, with the tanks remaining in communication with the atmosphere by reason of vent pipes 32a, 32b and 32c being open, the liquid in the tanks is flowed through the perforated screens or bottoms 34a, 34b and 34c and passes through manifold 31 into cooler C, wherein it is cooled to 5 to 10° C., as will be shown on thermometer 44. From cooler C the liquid will be run by proper manipulation of three-way cock 45 through pipes 46 and 46 into the primary extract receiving tank D, with its cooling coil 50 in operation to cool the atmosphere therein to 5 to 10° C.

When during the running of the liquid from the tanks the level of the liquid in the tanks has sunk to about the level of the coffee grounds, the balance of the brew in tank 1 is run into the tanks, with stirrer 5 of tank 1 in motion to keep the grounds uniformly suspended in the brew. Thereupon the liquid is run off completely from the tanks into receiving tank D, arriving therein with a temperature of about 5 to 10° C.

The extract thus drawn off from the tanks to receiving tank D (which I term the primary extract) having been extracted from the roasted coffee with a relatively small proportion of water, is already in a concentrated form, and having been made with its taste and aroma substances fully preserved against oxidation and volatilization is extraordinarily rich in fragrant coffee aroma and coffee taste. It requiring no concentration to improve it it is filled into trade containers, and after it has been preferably sterilized in the hermetically sealed trade containers it is ready for the market.

The portion of extract left in the coffee grounds, usually amounting to about twenty percent of the entire yield of extract obtained, is now washed out with water having a temperature of 10 to 15° C. and containing a small proportion of a suitable reducing agent, for example, 0.02 to 0.04% of sodium pyro-sulphite. The flow of the water through valve pipes 36a, 36b and 36c is preferably so regulated that the height of the liquid in the liquid gauges 37a, 37b and 37c remains as high as the top level of the coffee grounds in the tanks, which level is approximately indicated by line X—X.

The liquid flowing through and from the coffee grounds is run off from the tanks through cooler C, wherein it is cooled to about 5 to 10° C. Three-way cock 45 is then properly manipulated to cause this liquid to pass through pipe 47 and valve 56 into the distilling tank E. When the coffee grounds in the tanks have been exhausted of extract, as can be seen from samples taken by means of the two-way cock at the bottom of the liquid gauges 37a, 37b and 37c, the washing out of the grounds is stopped by closing the valved water pipes 36a, 36b and 36c and the valved outlet pipes 30a, 30b and 30c.

The coffee grounds are removed from the tanks by opening valved pipes 29a, 29b and 29c, these grounds being submerged in water they drop rapidly and readily into any suitable receiver therefor.

This dilute extract which has been run into the distilling tank E is heated therein, preferably after its entire collection therein, to boiling by opening the steam valves 58 and 59 of the steam jacket 57 in order to concentrate this dilute extract. Valve 67 of condenser F is then opened for the introduction of the cooling medium into the condenser and the vapors from the distilling tank E, which vapors carry the volatile aroma substances of the extract, are passed through pipe 66 into condenser F, where they are condensed. This condensing of the coffee extract vapors is so regulated that the distillate flowing from the condenser F through two-way cock 69, pipe 70 and valve 71, arrive in the distillate receiving tank G at a temperature of from 5 to 10° C., the cooling coil 73 in tank G being in operation to cool the atmosphere above the distillate in tank G.

When the distillate coming from the condenser F is free from aroma substances, as can be ascertained from samples taken at spigot 72, the subsequent distillate is run from the condenser F through two-way cock 69 and pipe y to any convenient waste receiver not shown. The boiling of the dilute extract in the distilling tank E is continued until the extract in tank E has been concentrated to the desired degree. The concentrated extract in tank E is then cooled by opening valve 63 of the cooling coil 62, the stirrer 61 being in motion at the same time, this cooling being continued until the temperature of the extract in tank E is reduced to 10 to 15° C. The aromatic distillate in distillate receiving tank G is then forced by any suitable means (as, for example, by the introduction of a suitably compressed gas into tank G through vent pipe 75) into distilling tank E and mixed therein with the concentrated extract, the stirring device 61 being in motion during this time. The concentrated extract in tank E is now ready to be filled into trade containers, in which trade containers it is preferably hermetically sealed and sterilized, after which it is ready for the market.

The product thus produced by returning the volatile aroma substances to the extract in tank E possesses to an extraordinarily large degree the pleasing fragrance of coffee aroma and coffee taste, which were fully preserved during the concentration of the coffee extract and the distilling of the volatile aroma substances because of the presence of a reducing agent in the extract and in the vapors and in the distillate. The acid naturally contained in the coffee extract liberates during the heating of the extract, by its reaction upon the sodium pyro-sulphite, sulphur dioxide, which passed into the vapors and into the distillate, whereby the oxygen in the atmosphere of the tank E and condenser F combines with the sulphur-dioxide and is prevented from doing any injury to the aroma substances in the vapors and in the distillate. The distillate always contains some sulphurous acid and also some sulphuric acid.

With the object of producing a coffee distillate as a commercial article, the boiling of the extract is carried out only as far as is necessary to collect the aromatic portion of the coffee extract, which may be marketed as such as a coffee distillate, preferably after it has been sterilized in the hermetically sealed trade containers so that it will keep for any length of time. The distillate containing all the volatile aroma substances of the coffee extract in a much more concentrated form than the extract is most excellently adapted as a caffeine-free addition to a caffeine-free coffee extract and a caffeine-free coffee beverage, which are usually very poor in coffee aroma. It also can be used to great advantage as an addition to the customary coffee beverage that is to have a more pronounced coffee aroma than it usually possesses.

As will be understood, the tanks are not employed in applicant's method for extracting the roasted coffee, but are employed for drawing off the extract already extracted from the coffee. The extraction having been carried out in a separate vessel (tank 1) especially equipped for extracting roasted coffee, in which the extraction of the roasted coffee is carried out with all the water-soluble substances contained in the roasted coffee made soluble by the use of heat of a sufficiently high temperature and by the simultaneous operation of a stirring device. This is made possible by the presence of a volatilizable reducing agent in the brew and in the vapors in the atmosphere above the brew, whereby loss of aroma substances by oxidation is entirely prevented and by which an extract with the highest yield of coffee aroma substances is obtained, the loss of aroma substances by volatilization being prevented by hermetically sealing the extraction tank or vessel during the heat treatment and by cooling the brew, after the extraction of the coffee has been completed, to a temperature sufficiently low to prevent volatilization of coffee aroma.

It is thus seen that by the use of my invention the problem of producing a coffee distillate has been effectively solved. Only by the successful solution of this problem has it become possible to produce a concentrated coffee extract.

It is further understood that by the use of my invention a coffee extract of any desired high concentration may be produced without depreciation in coffee aroma and coffee taste, this being carried out in an economical manner. The primary extract may also be concentrated to a fraction of its original volume, the extract produced being in liquid form even with the highest concentration because of the distillate added to it being always in liquid form. The distillate, as will be readily understood from the drawing, may be added either to the extract in the distilling tank E or to the primary extract in the primary extract receiving tank D. It is also seen that my method is carried out in the presence of a reducing agent whereby loss of coffee aroma by oxidation and volatilization is prevented.

It is further understood that wherever reference is made throughout this specification to cooling coils, a cooler, a condenser, or the like, that any suitable cooling medium, such as cold water, brine, or the like, may be used as desired.

Having now described my invention, I claim:—

1. A coffee distillate containing the volatile aroma substances of roasted coffee, water and a reducing agent.

2. A coffee distillate comprising the volatile aroma substances of roasted coffee, water and sulphurous acid.

3. A heat sterilized coffee distillate containing a reducing agent.

4. A concentrated coffee extract base containing the water-soluble substances of roasted coffee, water and a reducing agent.

5. A heat sterilized concentrated coffee extract containing water and a reducing agent.

6. A method of producing coffee extract, which comprises heating and cooling a concentrated mixture of ground roasted coffee and water in the presence of a reducing agent in a hermetically sealed container, whereby loss of coffee aroma by oxidation and volatilization is avoided, carrying out the separation of the primary extract from the grounds in the presence of a reducing agent at a sufficiently low temperature in a closed container in communication with the atmosphere, whereby loss of coffee aroma by oxidation and volatilization is avoided, collecting the extract in a closed receiver, cooling the atmosphere in the receiver, whereby loss of coffee aroma by volatilization is avoided, and filling the extract into the trade packages.

7. The method of producing concentrated coffee extract, which comprises boiling coffee extract in a still in the presence of a reducing agent, whereby loss of coffee aroma by oxidation in the extract, in the vapors and in the distillate is avoided, cooling the distillate, collecting the aromatic portion of the distillate, washing the non-aromatic portion of the distillate, until the extract has been sufficiently concentrated, and combining the cooled aromatic portion of the distillate with the cooled concentrated extract.

8. The method of producing coffee extract, which comprises extracting roasted coffee with a relatively small proportion of water in the presence of a volatilizable reducing agent, separating the extract from the grounds as a finished product, washing out the extract left in the grounds with water containing a volatilizable reducing agent, splitting the washed out extract by boiling in a still into a concentrated extract and a distillate containing the volatile aroma substances of the extract, recombining the extract and the volatile aroma substances to form a finished product.

9. The method of producing a coffee distillate, which comprises charging a still with coffee extract, boiling the extract in the still in the presence of a volatilizable reducing agent, whereby the reducing agent passes into the vapors, condensing the vapors, whereby the reducing agent passes into the distillate, cooling the distillate to a sufficiently low temperature, whereby loss of coffee aroma substances by volatilization is avoided, filling the cooled distillate into the trade containers and sterilizing the distillate in the hermetically sealed trade containers.

10. The steps in the method of producing coffee extract with water as the solvent, which comprises extracting roasted coffee with a relatively small proportion of water in a hermetically sealed container in the presence of a reducing agent and separating the extract from the grounds in the presence of a reducing agent in a closed container in communication with the atmosphere at a sufficiently low temperature to avoid loss of coffee aroma by oxidation and volatilization.

11. The step in the method of producing a coffee distillate, which comprises boiling off the volatile aroma substances from coffee extract in the presence of a volatilizable reducing agent.

12. Apparatus for extracting ground roasted coffee with water comprising, in combination, a closed container, means for introducing the coffee into the container, means for introducing the water into the container, means for venting the container, means for heating the coffee brew, means for cooling the coffee brew and means for cooling the atmosphere above the coffee brew in the container.

13. Apparatus for treating coffee extract comprising, in combination, a closed container, means for introducing coffee extract into the container, means for venting the container and means for cooling the atmosphere above the coffee extract in the container and means for removing the coffee extract from the container.

HERMAN HEUSER.